United States Patent
Ahlström et al.

(10) Patent No.: US 6,366,652 B1
(45) Date of Patent: Apr. 2, 2002

(54) METHOD AND APPARATUS FOR USING A VM TONE TO PREVENT A VOICE ANNOUNCEMENT IN A GROUP CALL

(75) Inventors: Lars Gunnar Folke Ahlström, Västra Frölunda; Jan Peter Ramle, Mölnlycke, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/330,232

(22) Filed: Jun. 10, 1999

(51) Int. Cl.⁷ .............................. H04M 1/64; H04M 3/42
(52) U.S. Cl. ...................... 379/88.24; 379/67.1; 379/80; 379/210.01; 379/211.03; 379/211.04
(58) Field of Search ........................ 379/67.1, 70, 80, 379/81, 82, 88.18, 88.23, 88.24, 201.07, 201.08, 211.03, 211.04, 220.01, 213.01, 210.01

(56) References Cited

U.S. PATENT DOCUMENTS

| 5,206,901 A | * | 4/1993 | Harlow et al. ............... 379/211 |
| 5,333,173 A | * | 7/1994 | Seazholtz ..................... 379/45 |
| 5,487,111 A | * | 1/1996 | Slusky ......................... 379/211 |
| 5,742,905 A | * | 4/1998 | Pepe et al. ................... 455/461 |
| 5,752,191 A | | 5/1998 | Fuller et al. ................. 455/445 |
| 5,822,405 A | * | 10/1998 | Astarabadi ................ 379/88.04 |
| 6,104,799 A | * | 8/2000 | Jain et al. .................... 379/210 |

FOREIGN PATENT DOCUMENTS

| EP | RS 103325 | 2/2000 |
| WO | WO 97/01252 | 1/1997 |
| WO | WO 98/09423 | 3/1998 |

* cited by examiner

Primary Examiner—Allan Hoosain
(74) Attorney, Agent, or Firm—Jenkens & Gilchrist, P.C.

(57) ABSTRACT

A technique for preventing voice announcements in a group call is provided. A VM tone begins a voice announcement of a voice mail system. Parties that cause the VM tone to be transmitted are not added to the group call. This approach guarantees that no voice announcements will be added to the group call. With this approach, all subscribers are allowed to use voice mail systems, but the subscribers currently forwarding messages to voice mail will not be connected to group calls.

19 Claims, 6 Drawing Sheets

METHOD AND APPARATUS FOR USING A VM TONE TO PREVENT A VOICE ANNOUNCEMENT IN A GROUP CALL

CROSS-REFERENCE TO RELATED APPLICATIONS

This Application relates to the applications entitled:
METHOD AND APPARATUS FOR USING A MS TONE TO PREVENT A VOICE ANNOUNCEMENT IN A GROUP CALL, Ser. No. 09/330,468 and
METHOD AND APPARATUS FOR USING A B-ANSWER SIGNAL TO PREVENT A VOICE ANNOUNCEMENT IN A GROUP CALL Ser. No. 09/329,897

These applications are being filed simultaneously herewith in the U.S. Patent & Trademark Office.

FIELD OF THE INVENTION

The present invention relates generally to mobile networks and, more particularly, to a technique which supports group calls in mobile networks.

BACKGROUND OF THE INVENTION

One important service provided by a group server connected to a Public Land Mobile Network (PLMN) is that of automatically establishing group calls. A group call is a conference call in which all participants can in turn talk and listen to each other, or, alternately, a broadcast call in which all the participants simultaneously receive a transmitted message. Another important service which is starting to be provided in PLMNs is that of voice mail. This service allows a mobile subscriber to, instead of immediately receiving a telephone call from a calling party, forward the call to a voice mail system which will then offer the calling party an opportunity to leave a voice mail message, which is then stored and later retrieved by the mobile subscriber. A problem may develop in the interaction of these two services, in that, during the process of setting up a group call, one of the mobile stations may have the call forward feature set so that all of its calls are forwarded to a voice mail system. In this case, a connection for the call will be made to the voice mail system which will then produce a voice mail announcement. Thus, a connection will not be established to the intended mobile station, and if nothing is done further to correct this unintended action, the automated group controller will connect the voice mail system to the group call.

In the related art, there are several solutions which have been proposed to solve this problem. Each of the solutions has corresponding disadvantages. One proposed solution is to permanently switch off the call forward service for all subscribers that may be part of a group call. However, this would preclude these subscribers from using the call forward feature. Since the call forward feature is a standard feature in PLMNs, this is not a desirable solution.

Another proposed solution is to provide a mobile subscriber with dual subscriptions, i.e. a subscription exclusively dedicated to group calls and a regular subscription for all other calls. The group call subscription would have call forward service permanently disabled. The regular subscription would allow the call forward service. Although dual subscriptions appears to be a good solution, this solution may cause conflict with fraud detection systems in the network since the mobile equipment can change subscriptions very quickly.

In yet another proposed solution, it is possible for the automated group controller to switch off the call forward service for the terminating parties, i.e. the parties to be added to the group call. In this approach, the automated group controller accesses the home location register (HLR) to determine if the called party is detached or otherwise unreachable. The automated group controller may then switch off the call forward service of the called party. However, there are problems with this approach. First, an interface will have to be developed exclusively to enable this interaction between the automated group controller and the HLR. Then there is the security problem of providing HLR information to the automated group controller. There is also a problem if someone else calls the terminating party after the call forward service has been switched off. There is also a problem if the automated group controller fails to reset the changes in the HLR. Additional problems result in handling additional call forward services, such as call forward on no reply and call forward on busy.

In yet another proposed solution, the automated group controller detects a backward notification of the call forward service and only adds those parties that have not enabled the call forward feature. Backward notification only works for an automated group controller using the Integrated Services Digital Network User Part (ISUP) of some versions of the Global Systems For Mobile Communications (GSM). In these versions of GSM, a backward notification signal is sent to the automated group controller indicating that a call forward service is in progress, e.g., Advance Mobile Phone Service (AMPS) networks do not support backward notification of a call forward service.

In view of the foregoing, it would be desirable to provide one or more techniques which overcomes the above-described inadequacies and shortcomings of the above-described proposed solutions.

SUMMARY OF THE INVENTION

According to the present invention, a technique for using a VM tone to prevent a voice mail announcement in a group call is provided. Preferably, the VM tone is an audio signal comprising one or more superimposed amplitude modulated frequencies with a distinct cadence and duration. A group controller is configured to detect the VM tone and exclude from a group call parties that transmit the VM tone. This approach guarantees that voice mail announcements will be prevented in the group call. With this approach, all subscribers are allowed to use voice mail systems. However, subscribers that are currently forwarding messages to voice mail systems will not be connected to the group call.

In one aspect of the present invention, the group call can be initiated by an originator sending a group call number over a telecommunication network to a group controller. Preferably, the telecommunication network includes one or more Public Land Mobile Networks and may include a Public Switched Telephone Network. The group controller, in response to the initiation by the originator, establishes a plurality of individual call connections over the network to a plurality of potential participants of the group call identified by the group call number. The group controller establishes the call connections by making an individual call to each of the plurality of potential participants of the group call. Preferably, the potential participants are subscribers of one of the Public Land Mobile Networks. At least one of the participants is a first participant who forwards its individual call connection to a voice mail system coupled to the network. The voice mail system generates a voice announcement in response to the forwarded individual calls. The voice announcement begins with a VM tone. Upon detection of the VM tone, the first participant is excluded from the group call. In another aspect of the present invention, detection of the VM tone is implemented by a detector associated with the group controller, the detector being configured to detect the VM tone.

In yet another aspect of the present invention, an apparatus prevents voice mail announcements in a group call having a plurality of potential participants. The group call is established in a telecommunications network by signaling the plurality of potential participants of the group call. A voice mail system, coupled to the network, is configured to generate an announcement upon being signaled over the network. The announcement begins with a VM tone which identifies the announcement. A group controller, coupled to the network, is configured to detect the VM tone and further configured to exclude from the group call, upon detection of the VM tone, each participant who signals the voice mail system over the network, thereby causing the voice mail system to generate an announcement and the voice mail (VM) tone. A participant typically signals the voice mail system by forwarding calls to the voice mail system over the network.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
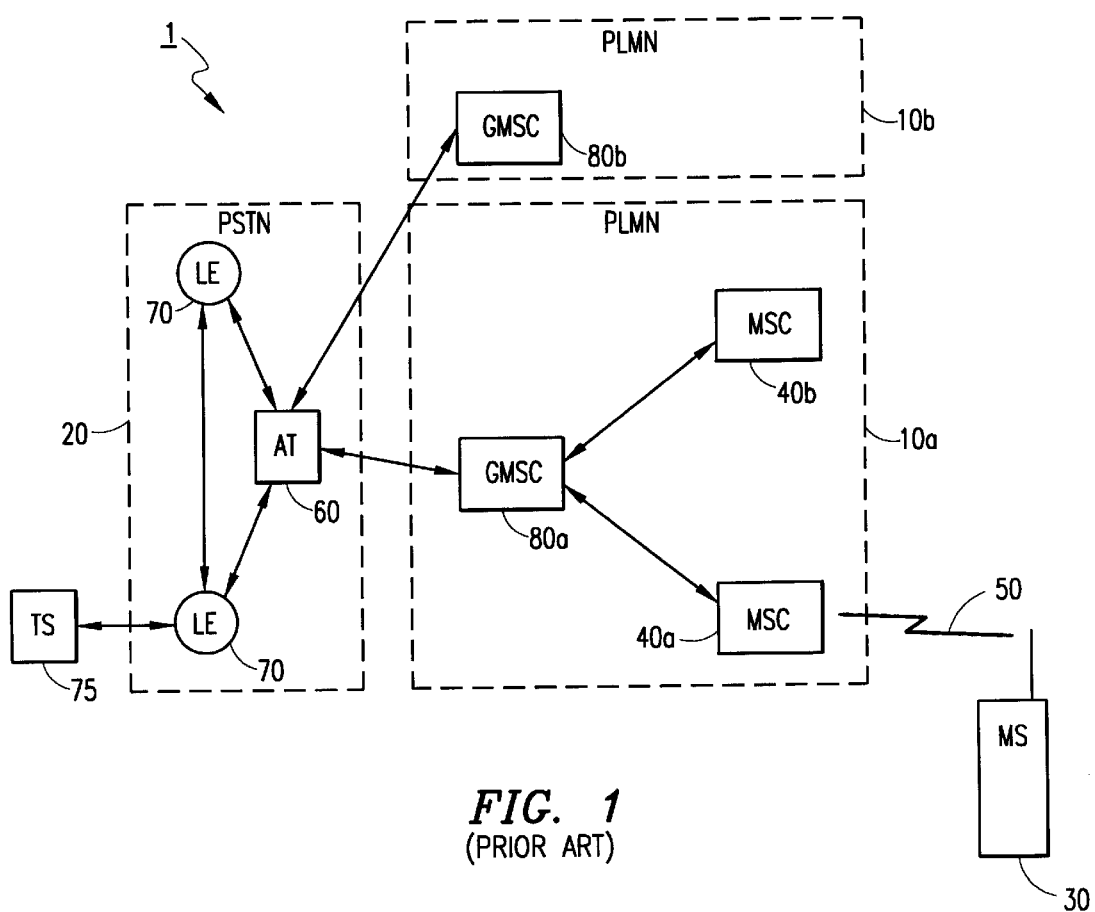
FIG. 1 is a block diagram illustrating the network connection of multiple Public Land Mobile Networks (PLMNs) to a Public Switched Telephone Network (PSTN) in accordance with the present invention.

Referring to FIG. 1, there is shown a block diagram illustrating a telecommunications network 1 having multiple Public Land Mobile Networks (PLMNS) 10 interconnected to a Public Switched Telephone Network (PSTN) 20. A mobile station (MS) 30 is associated with one of the PLMNs 10 (i.e., the home PLMN 10a). Within each PLMN 10, there are a number of different mobile switching centers (MSC) 40 servicing the geographical area covered by that PLMN 10. A home location register (HLR, not shown) and a visitor's location register (VLR, not shown) are associated with each MSC 40. The mobile station (MS) 30 is serviced by one of the MSCs 40 (i.e., the servicing MSC 40a). The servicing MSC 40a establishes call connections over a radio link 50 with the mobile station (MS) 30. Within each PLMN 10, there exists a Gateway Mobile Switching Center (GMSC) 80 for routing incoming calls intended for a mobile station to the appropriate MSC 40. The PLMNs 10 establish call connections with telephone subscribers of the PSTN 20 via the GMSCs 80. Thus, a mobile phone subscriber at mobile station (MS) 30 is capable of communicating through the network 1 with a telephone subscriber of the PSTN 20 at a telephone station (TS) 75 associated with the PSTN 20. As an illustration, a call to the MS 30 initiated at the TS 75 is routed to one of the local exchanges (LE) 70 of the PSTN 20, which then routes the call to an access tandem (AT) 60. The access tandem (AT) 60 then routes the call to the GMSC 80a, which then routes the call to the MSC 40a, i.e the mobile switching center servicing the mobile station 30. The MSC 40a then finds the location of the mobile station 30 in its HLR and routes the call to the mobile station 30 over the radio link 50.

Figure 2:
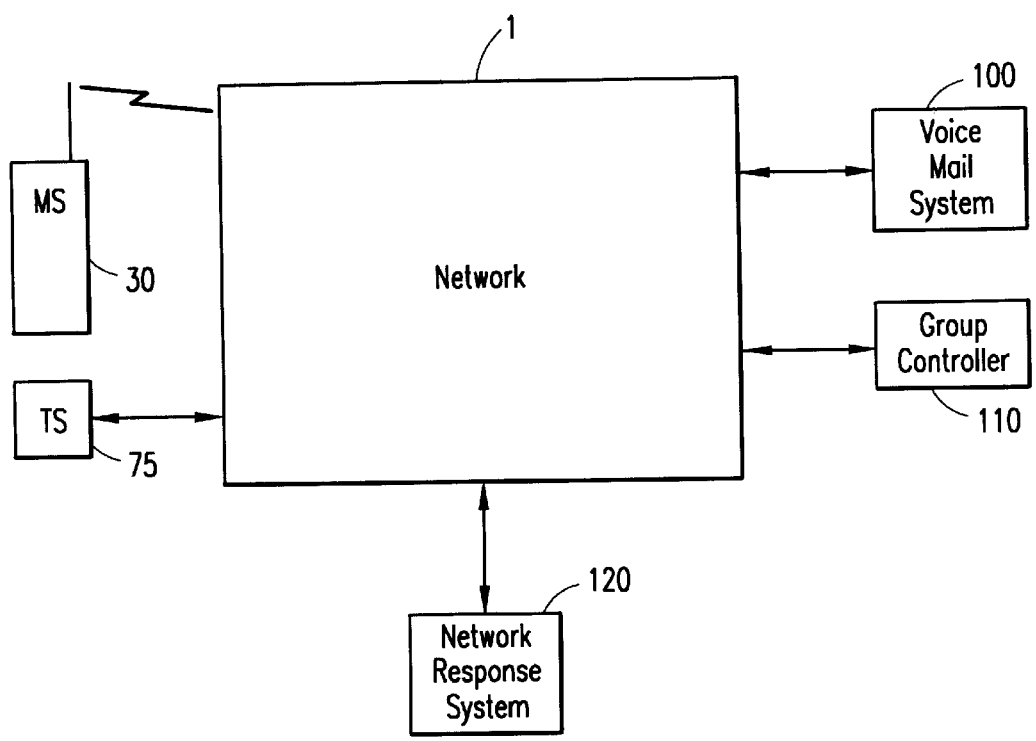
FIG. 2 is a block diagram illustrating the telecommunication network of FIG. 1 being coupled to systems providing services to that network.

FIG. 2 illustrates the telecommunications network 1 coupled to a voice mail system 100, a group controller 110, and a network response system 120. These systems may communicate with each other and network subscribers (e.g., MS 30 and TS 75) over the communication paths of the network 1.

The group controller 110 is responsible for setting up and then monitoring ongoing group calls for the network 1. The group controller 110 is preferably associated with an MSC 40. However, the group controller 110 generally may be connected to any location of network 1 using the available communication paths of network 1. The group controller 110 may be an independent server, or alternately, a group of distributed servers, or a computer system.

The voice mail system 100 is configured to record, store, and retrieve messages forwarded from the mobile stations, e.g., mobile station 30, of one or more Public Land Mobile Networks 10 of network 1. Typically, the voice mail system 100 is shared by several MSCs in a PLMN.

The network response system 120 is configured to respond to a failed call setup, e.g., a called party is unreachable, placed to mobile stations associated with a PLMN 10. For example, a call placed through the network 1 may not be able to reach a mobile station that has suddenly dropped out due to lack of radio coverage. In this situation, the network response system 120 transmits a message to the calling party explaining that a call connection cannot be made.

Figure 3:
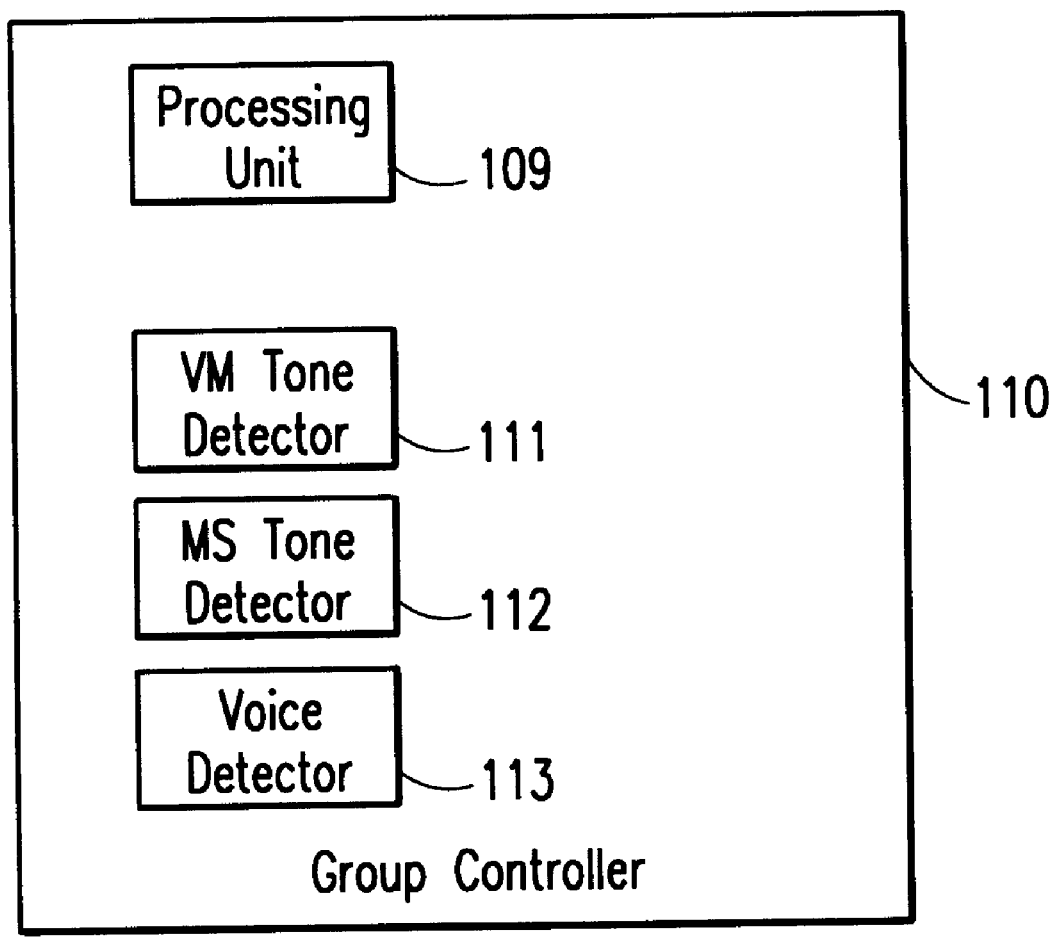
FIG. 3 is a block diagram illustrating a group controller of group calls according to the present invention.

FIG. 3 illustrates an embodiment of the group controller 110 according to the present invention. The group controller 110 includes a processing unit 109 configured to perform the tasks of setting up and managing one or more group calls. The group controller 110 also includes a voice mail (VM) tone detector 111, a mobile station (MS) tone detector 112, and a voice detector 113, each for detecting signals of incoming calls. The method and apparatus of the present invention specifically employs the VM tone detector 111. The MS tone detector 112 is employed in the previously referenced related application entitled "Method and Apparatus For Using A MS Tone To Prevent A Voice Announcement In A Group Call" and the voice detector 113 is employed in the previously referenced related application entitled "Method and Apparatus For Using A B-Answer Signal To Prevent A Voice Announcement In A Group Call".

Figure 4:
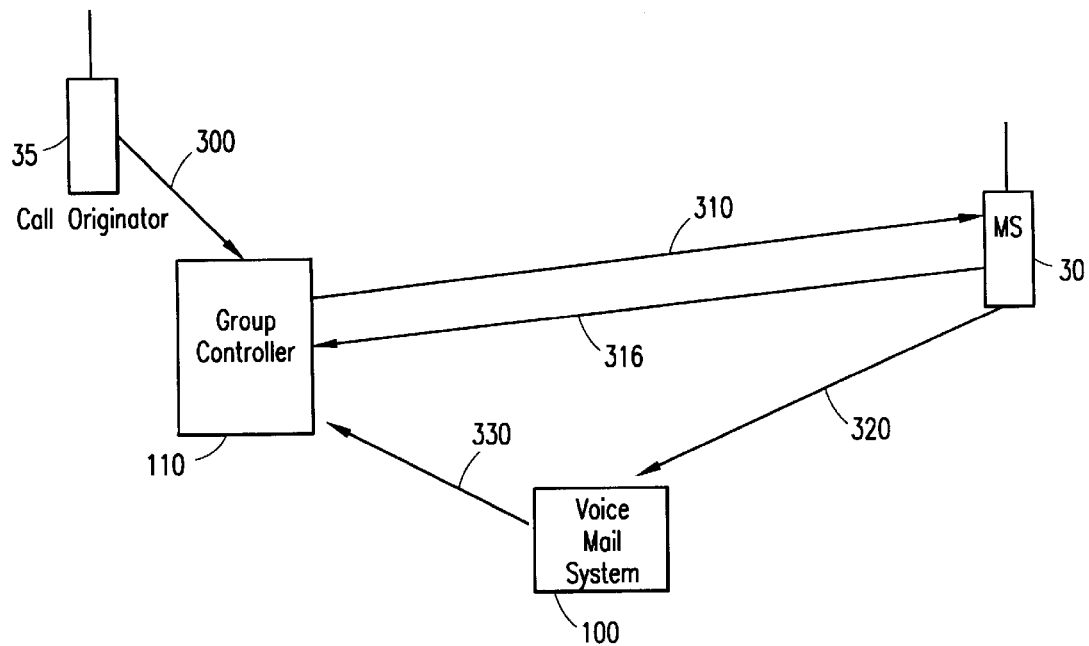
FIG. 4 is a block diagram illustrating the sequence of events involved in setting up a group call using a voice mail (VM) tone so as to prevent voice mail announcements according to the present invention.
Figure 5:
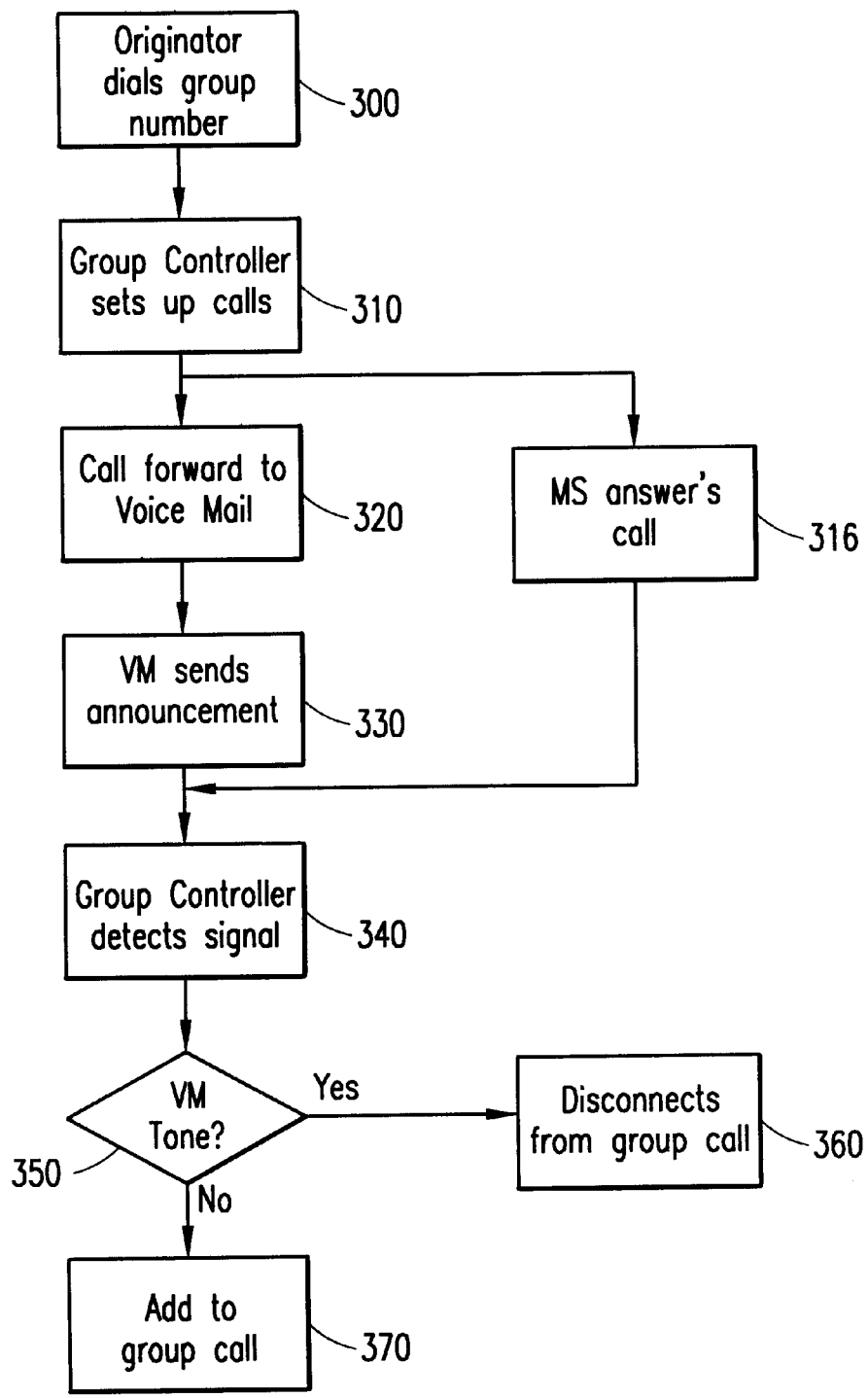
FIG. 5 is a logic diagram illustrating a technique of using a VM tone to prevent voice mail announcements that a group controller may incorporate to implement the present invention.
Figure 6:
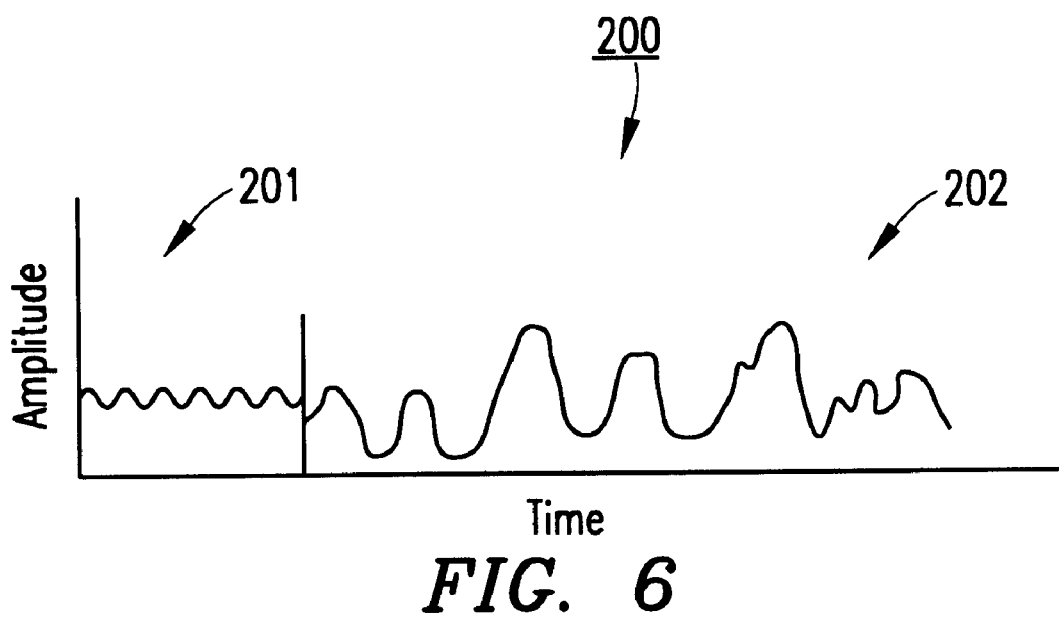
FIG. 6 is a diagram illustrating a VM tone signal generated by a voice mail system according to the present invention.

The present invention can best be understood with reference to FIGS. 4–6. FIG. 4 illustrates the various components involved in preventing voice mail announcements in a group call using a voice mail (VM) tone according to the present invention. The various components include a call originator 35 for initiating a request for a group call by supplying a group call number, a mobile station 30 exemplary of the participants in the group call, a voice mail system 100, and a group controller 110. FIG. 4 also illustrates, in conjunction with FIG. 5, the sequence of events involved in setting up a group call using a voice mail (VM) tone to prevent voice mail announcements according to the present invention.

FIG. 5 is a logic diagram illustrating the steps involved in preventing voice mail announcements in a group call using a voice mail (VM) tone according to the present invention. At step 300, the originator 35 of the group call, which may be a fixed station coupled to the PSTN 20 or a mobile station coupled to one of the PLMNs 10, initiates a group call by dialing a group number which is identified by the network 1 (typically at an MSC) and passed on to the group controller 110. At step 310, the group controller 110 attempts to establish a connection through the network 1 with every subscriber in the list of subscribers associated with the group call (including the call originator 35) by making an individual call to each of the subscribers in the list of subscribers associated with the group call. In the case where one of the subscribers answers its individual call (i.e., the mobile station 30), a connection is established with that subscriber (in step 316). In the case where, after a predetermined time limit (or, the call could be forwarded immediately), one of the subscribers does not answer its individual call, the call is forwarded to the voice mail system 100 (in step 320). This requires the subscriber to have the supplementary Call Forward service.

A connection is then established between the voice mail system 100 and the group controller 110. After being connected to the group controller 110, the voice mail system 100 sends a voice announcement to the group controller 110 (in step 330). The voice announcement includes a recorded voice mail message such as, for example, a human or digital voice presenting a message to the calling party, e.g. a request to leave a message. The voice announcement also includes a VM tone which precedes the voice mail message. The VM tone is typically an audio signal consisting of one or more superimposed amplitude modulated frequencies with a distinct cadence and duration, but other forms are also possible. In any event, the VM tone must be sufficiently unique from other tones and signals processed by the group controller 110 so that the group controller 110 can determine that a voice mail system has been reached. FIG. 6 illustrates an exemplary voice announcement 200 generated by the voice mail system 100 comprising a voice mail message 202 preceded by the VM tone 201.

The group controller 110 and associated processing unit 109 implement steps 340, 350, 360, and 370. At step 340, the VM (voice mail) tone detector 111 of the group controller 110 is configured to receive a signal from the called party on the established connection. In step 350, the group controller 110 determines whether the connection has been established with the subscriber at mobile station 30 (i.e., through step 316), or to the voice mail system 100 (i.e., through steps 320 and 330). In the case where the VM detector 111 of the group controller 110 senses the VM tone indicating a connection to the voice mail system 100, the group controller 110 excludes the call from the group call (in step 360). If the VM tone is not detected after a predetermined period of time, the group controller 110 adds the call to the group call (in step 370).

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for preventing voice mail announcements in a group call, the group call involving a plurality of potential participants of the group call, each of the plurality of potential participants of the group call receiving an individual call from a group controller, a first potential participant of the plurality of potential participants of the group call forwarding its received individual call to a voice mail system, the method comprising the steps of:

generating a voice announcement for the first potential participant in response to the forwarded individual call, the voice announcement precluded by a voice mail tone;

detecting the voice mail tone; and excluding, upon detection of the voice mail tone, the first potential participant from the group call.

2. The method of claim 1, wherein:

the detecting step is implemented by a detector associated with the group controller, the detector being configured to detect the voice mail tone.

3. The method of claim 1, wherein:

the step of excluding the first potential participant from the group call includes disconnecting the first potential participant from the group call.

4. The method of claim 1, wherein:

the group call is formed over a telecommunication network which includes one or more Public Land Mobile Networks.

5. The method of claim 1, wherein:

the group call is formed over a telecommunications network which includes a Public Switched Telephone Network.

6. The method of claim 1, further comprising the step of:

connecting to the group call a second potential participant of the plurality of potential participants of the group call, the second potential participant not forwarding its individual call to the voice mail system so that the voice mail tone is not generated or detected.

7. The method of claim 1, wherein:

the plurality of potential participants of the group call are subscribers of a Public Land Mobile Network or a Public Switched Telephone Network.

8. An apparatus for preventing voice mail announcements in a group call, the group call having a plurality of potential participants, the group call being established in a telecommunications network by signaling the plurality of potential participants of the group call, the apparatus comprising:

a voice mail system, coupled to the network, configured to generate a voice announcement upon being signaled over the network by a first potential participant of the group call, the voice announcement precluded by a voice mail tone; and a group controller, coupled to the network, configured to detect the voice mail tone and, upon detection of the voice mail tone, to exclude the first potential participant of the group call from the group call.

9. The apparatus of claim 8, wherein:

the voice announcement begins with the voice mail tone.

10. The apparatus of claim 8, wherein:

the telecommunication network includes one or more Public Land Mobile Networks.

11. The apparatus of claim 8, wherein:

the telecommunication network includes a Public Switched Telephone Network.

12. The apparatus of claim 8, wherein:

the group controller is further configured to connect to the group call a second potential participant of the plurality of potential participants of the group call, the second potential participant not signaling the voice mail system so that the voice mail tone is not generated or detected.

13. The apparatus of claim 8, wherein:

the plurality of potential participants of the group call are subscribers of a Public Land Mobile Network or a Public Switched Telephone Network.

14. A telecommunications system, comprising:

a telecommunications network for connecting a plurality of subscribers;

a group controller, coupled to the network, for setting up a group call by selecting a plurality of potential participants from the plurality of subscribers and making individual calls in the network to each potential participant of the plurality of potential participants; and a voice mail system, coupled to the network for receiving a first individual call connection from a first potential participant of the plurality of potential participants, and for generating, in response to the first individual call a, voice announcement precluded by a voice mail tone, the voice mail tone identifying that the voice mail system has been called.

15. The telecommunications system of claim 14, wherein:

the voice announcement begins with the voice mail tone.

16. The telecommunications system of claim 14, wherein:

the group controller is configured to detect the voice mail tone and, upon detection of the voice mail tone, exclude from the group call the first potential participant of the group call.

17. The telecommunications system of claim 14, wherein:

the telecommunication network includes one or more Public Land Mobile Networks.

18. The telecommunications system of claim 14, wherein:

the telecommunication network includes a Public Switched Telephone Network.

19. The telecommunications system of claim 14, wherein:

the plurality of potential participants of the group call are subscribers of a Public Land Mobile Network or a Public Switched Telephone Network.

* * * * *